United States Patent
Butt et al.

(10) Patent No.: US 9,069,066 B2
(45) Date of Patent: Jun. 30, 2015

(54) RADAR DECEPTION JAMMING PREVENTION USING BI-STATIC AND MONO-STATIC RADARS

(71) Applicants: Faran Awais Butt, Lahore (PK); Ijaz Haider Naqvi, Lahore (PK); Ali Imran Najam, Wah Cantt (PK)

(72) Inventors: Faran Awais Butt, Lahore (PK); Ijaz Haider Naqvi, Lahore (PK); Ali Imran Najam, Wah Cantt (PK)

( * ) Notice: Subject to any disclaimer, the term of this patent is extended or adjusted under 35 U.S.C. 154(b) by 270 days.

(21) Appl. No.: 13/898,081

(22) Filed: May 20, 2013

(65) Prior Publication Data

US 2014/0354464 A1 Dec. 4, 2014

(51) Int. Cl.
*G01S 7/36* (2006.01)
*G01S 13/87* (2006.01)
*G01S 13/24* (2006.01)
*G01S 13/66* (2006.01)
*G01S 7/00* (2006.01)
*G01S 13/00* (2006.01)

(52) U.S. Cl.
CPC ............... *G01S 13/003* (2013.01); *G01S 13/66* (2013.01); *G01S 7/36* (2013.01); *G01S 13/24* (2013.01); *G01S 13/87* (2013.01)

(58) Field of Classification Search
CPC ........... G01S 7/02; G01S 7/36; G01S 13/003; G01S 13/66; G01S 13/02; G01S 13/06; G01S 13/08; G01S 13/10; G01S 13/24; G01S 13/87
USPC ........................ 342/13–20, 59, 104–115, 118, 342/125–140, 146, 147, 175, 195, 21, 22
See application file for complete search history.

(56) References Cited

U.S. PATENT DOCUMENTS

| | | | | |
|---|---|---|---|---|
| 3,184,739 A * | 5/1965 | Franklin et al. | ................. | 342/16 |
| 3,866,224 A * | 2/1975 | Porter et al. | .................... | 342/16 |
| 3,896,442 A * | 7/1975 | Heminway et al. | ............ | 342/17 |
| 3,981,013 A * | 9/1976 | Christensen | .................. | 342/129 |
| 5,410,316 A * | 4/1995 | Brooks | .......................... | 342/59 |
| 6,456,229 B2 * | 9/2002 | Wurman et al. | ................ | 342/59 |
| 6,462,699 B2 * | 10/2002 | Wurman et al. | ................ | 342/59 |
| 6,977,610 B2 * | 12/2005 | Brookner et al. | .............. | 342/59 |
| 8,060,339 B2 * | 11/2011 | Ammar | .......................... | 342/22 |
| 2006/0238403 A1 * | 10/2006 | Golan et al. | .................... | 342/59 |

FOREIGN PATENT DOCUMENTS

FR 2938073 A1 * 5/2010 ............. G01S 13/74

* cited by examiner

*Primary Examiner* — Bernarr Gregory
(74) *Attorney, Agent, or Firm* — Sarfaraz K. Niazi

(57) ABSTRACT

A method of preventing the jamming of radars is provided utilizing two radars located at a distance to prevent both velocity and range pull off.

2 Claims, 5 Drawing Sheets

RADAR DECEPTION JAMMING PREVENTION USING BI-STATIC AND MONO-STATIC RADARS

BACKGROUND OF THE INVENTION

In mono-static pulse radar, there is a single antenna which acts as both the transmitter and the receiver (transceiver). It operates on a simple principle of listening to the echo of the transmitted pulse when it is reflected from the target threat. Most of the modern radars are mono-static where a duplexer separates the transmitted and received pulses.

The bi-static radar has a separate antenna systems as the transmitter and the receiver. Unlike the continuous wave radars in which the distance between the transmitter and the receiver is very small, bi-static radar has this systems physically separated by a distance comparable to the target distance. Since the invention of the duplexer, pulse based mono-static radars are typically used for military purpose ground based radars. In our proposed solution, bi-static radars are used in combination with the mono-static radars to mitigate the Electronic Countermeasures (ECM) effects of deception jamming.

BRIEF SUMMARY OF THE INVENTION

We propose a novel configuration of mono-static and bi-static radars which are physically positioned in such a way that the transmitter, receiver and the target make a scalene triangle. We assume that there is mutual exchange of information between the two radar systems. The advantage of using such a scheme is that it requires a very low level of frequency agility and localizes the target in the presence of Velocity Gate Pull Off and Range Gate Pull Off (VGPO/RGPO).

DETAILED DESCRIPTION OF THE INVENTION

Figure 1:
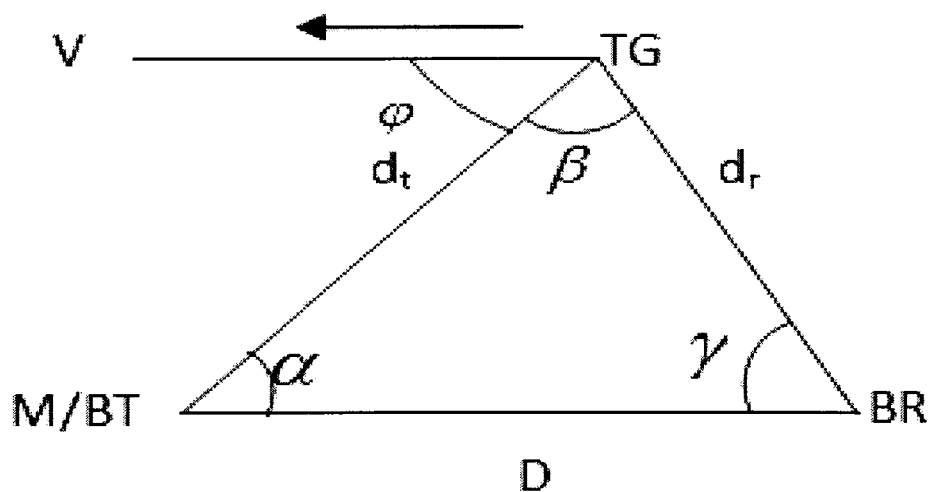
FIG. 1 depicts a configuration of proposed idea using mono-static and bi-static radar.

In order to carry out deception jamming, velocity gate pull off and range gate pull off (VGPO/RGPO) are typically employed. With the advent of digital radio frequency memory (DRFM), these deception techniques have been becoming increasingly successful and therefore these techniques have been excessively used by the incoming targets in recent times.

Electronic Counter Measure refers to a system that intends to disturb the normal working of radar. DRFM is a technique in which high speed sampling and digital memory is used to store radio frequency and microwave signals. It is becoming a popular technique for the implementation of false target ECM systems. These days, most of the fighter jets are equipped with jamming pods having DRFM technology.

The incoming RF signal is down shifted in frequency, sampled and the resulting numbers are stored in a high speed digital memory. To recreate the stored signal, the stored values are coherently reconstructed and then up converted to the original RF frequency.

RGPO uses the pulses that are generated in the jamming pod to deceive the transmission characteristics of the radar systems. Furthermore, the transmitted signal power at the false target frequencies are kept higher than the true reflected wave making it more and more difficult for a radar to detect the true target since the radar lock themselves on a received signal with the highest received power. Therefore, the radar tends to follow this ongoing transmission. Once this has been achieved, the jamming device can change the timing of returns to return the false target.

VGPO is used to confuse the Doppler radar systems by altering either the frequency or the phase of the received signal at the radar in such a way that the apparent velocity of target may be altered.

At first the target allows itself to get locked by the radar system. Once tracking radar has detected a target displayed on its plan position indicator, it will place range gates on either side of the detected target. Range gates filter out all signals which originate from the ranges other than this defined small window. Hence it increases the signal to noise ratio as well as it protects the radar against unsynchronized jamming pulses. The radar concentrates within this range interval which encloses the target location and it no longer looks out for other targets. This state is known as "lock on state". But such range gates can be deceived by breaking the lock and thus escaping from the window.

Speed pull jamming is one of the most widely-used velocity deception techniques. It can be divided into three stages. The first is the period of stop pulling. In this stage, a false target's Doppler frequency is equal to real targets echo. The stop time is slightly larger than the capture time of speed tracking circuit. The second stage is called a pulling stage. Doppler frequency of false target gradually separates from the real target. As the jamming energy is larger than the target echo, the speed tracking circuit is driven to track the jamming frequency. The third stage is the period of turn off. In this stage the jamming device stops transmission and hence target disappears for the radar. Eq. (1) shows that the jamming Doppler frequency ($f_{dj}$) is equal to the true Doppler frequency ($f_d$) for the time when gates are not locked on, but once they are locked the jammer shifts its frequency till time $t_2$ and eventually it stops transmission and hence target disappears for the radar.

$$f_{dj} = \begin{cases} f_d & 0 \leq t \leq t_1 \\ f_d + k(t - t_1) & t_1 \leq t \leq t_2 \\ 0 & t_2 \leq t \end{cases} \quad (1)$$

Where k is the separation velocity in Hz/sec.

Apart from the physical isolation of the system, most of the advantages of bi-static radar stem from the general geometric properties of the system. The knowledge of the transmitted signal is necessary at the receiver side. It is also essential to know the transmitted frequency if Doppler shift is to be determined.

In bi-static radar, target location requires total signal propagation time, orthogonal angle measurements by the receiver and the estimate of transmitter location, thus making transmitter-target-receiver triangle, called the bi-static triangle. We have proposed a configuration that takes advantage of the geometrical properties of bi-static radar along with mono-static radar hence making it semi multi-static radar using a very simple approach to nullify the deception and detect the target. The proposed idea uses the configuration as shown in FIG. 1. Following is the description of different symbols used in FIG. 1.

M=Mono-static radar's location
BT=Bi-static radar's transmitter location
In this configuration we have M=BT
TG=Target
BR=Bi-static radar's receiver location
Similarly,
$d_t$=Distance between mono-static radar (bi-static radar's transmitter) and target
$d_r$=Distance between bi-static radar's receiver and target
D=Distance between mono-static radar (bi-static radar's transmitter) and bi-static radar's receiver
$f_1$=mono-static radar's operating frequency
$f_2$=mono-static radar's operating frequency after identifying deception jamming
$f_3$=bi-static radar's operating frequency after identifying deception jamming
Target's relative velocity is v cos φ relative to station M.

The mono-static transceiver and the bi-static transmitter are co-located with each other at station M. Our proposed configuration of the mono-static and bi-static radars work in a synchronous mode. In a normal mode of operation that is ECM free condition, the transmitter of bi-static radar remains silent (and hence does not consume any power) and the receiver of bi-static radar, which works on dual frequency, receives the scattered echoes transmitted by mono-static radar i.e. $f_1$ The mono-static radar should operate on a different frequency band from the bi-static as it will lessen the impact of barrage jamming on bi-static radar which is the most effective type of noise jamming. And if in case the mono-static radar is noise jammed, the corresponding bi-static radar's receiver will be able to figure out the ongoing jamming.

Initially two parameters will be calculated which are α and $d_t$ and we are going to use these parameters in calculating the parameters of the bi-static radar. Now the positions of the three objects i.e., the transmitter and the receiver of the bi-static radar, and the target, make a scalene triangle similar to that shown in FIG. 1. We apply law of cosines to this triangle and calculate the distance from the target to the receiver and using the calculated parameters, again applying the cosine law to get the bi-static angle β. Hence, the bi-static radar is capable of calculating the location of the target even in the presence of gate pull off effects.

The mono static radar calculates the distance $d_t$ and the angle α by listening to the initial echo when the jamming device is waiting for the range gates to be locked. We already know the distance D, therefore to calculate the distance $d_r$, we apply the law of cosines at the receiver of bi-static radar which has been initially receiving the echo of target illuminated by M. Applying the law of cosine, we can write:

$$d_r^2 = d_t^2 + D^2 - 2d_t D \cos \alpha \quad (4)$$

(Here α and $d_t$ are calculated by M before being effectively deceived).

The equation (4) calculates the distance from the receiver of bi-static radar from the target. Now when the gates are locked and jammer is deceiving the M, then the BT transmits and the BR is expecting to receive the frequency associated with BT. At the same time, M is being deceived where as the BR is still not only identifying the jamming but also still locating the target.

Also we can calculate β by using other forms of law of cosine as $$\cos \beta = \frac{d_r^2 + d_t^2 - D^2}{2 \cdot d_t \cdot d_r} \quad (5)$$

When there is a real target, the Doppler frequency measured by both the receivers would be different. But if it is a velocity deception jamming, the Doppler frequency to both the stations would be equal to $f_{dj}$.

In case of ECM free condition, the Doppler frequency measured by mono-static radar would be $$f_{dm} = \frac{2v \cos \varphi}{\lambda} \quad (2)$$

The Doppler frequency measured by bi-static radar's receiver would be $$f_{db} = \frac{v(\cos(\varphi) + \cos(\varphi + \beta))}{\lambda}$$

Figure 2:
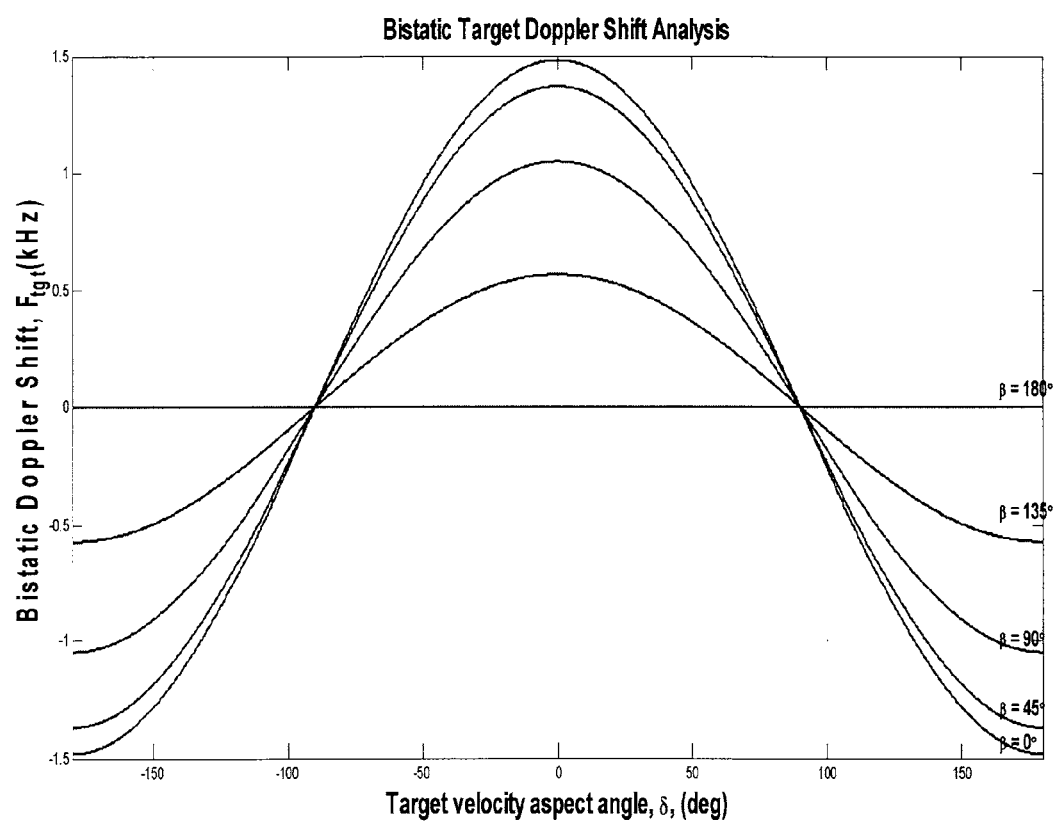
FIG. 2 depicts a Doppler shift versus aspect angle (calculated using bidarsa).

FIG. 2 shows the Doppler shift calculated for a target travelling at 800 km/hr. The numerical results show that for the aspect angle of 30 degree, Bi-static Doppler Shift is found to be 8.2473e-001 KHz and for 120 degree aspect angle Bi-static Doppler Shift is noted as −1.6537e-001 KHz.

Figure 3:
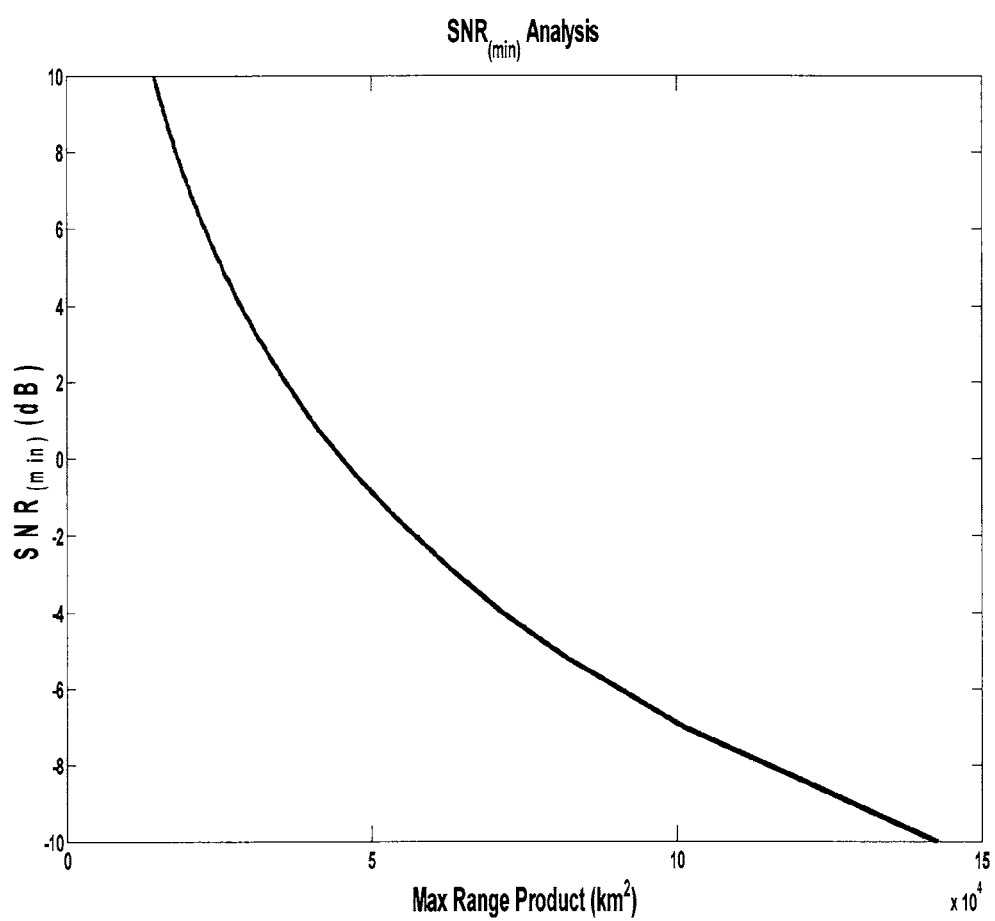
FIG. 3 depicts SNR versus Range product for bi-static radar working on 1 GHz frequency keeping transmitted power of 1.5 MW and baseline length of 20 km.
Figure 4:
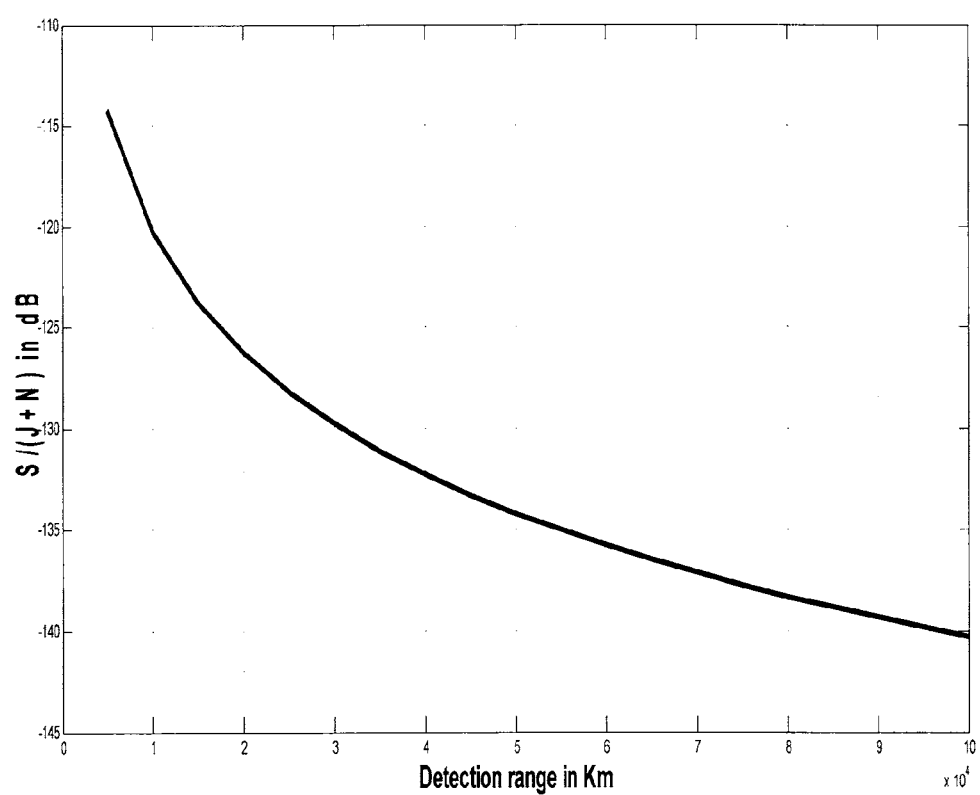
FIG. 4 depicts SNR versus Range for mono-static radar working on 1 GHz frequency keeping transmitted power of 1.5 MW and under jamming bandwidth of 10 MHz
Figure 5:
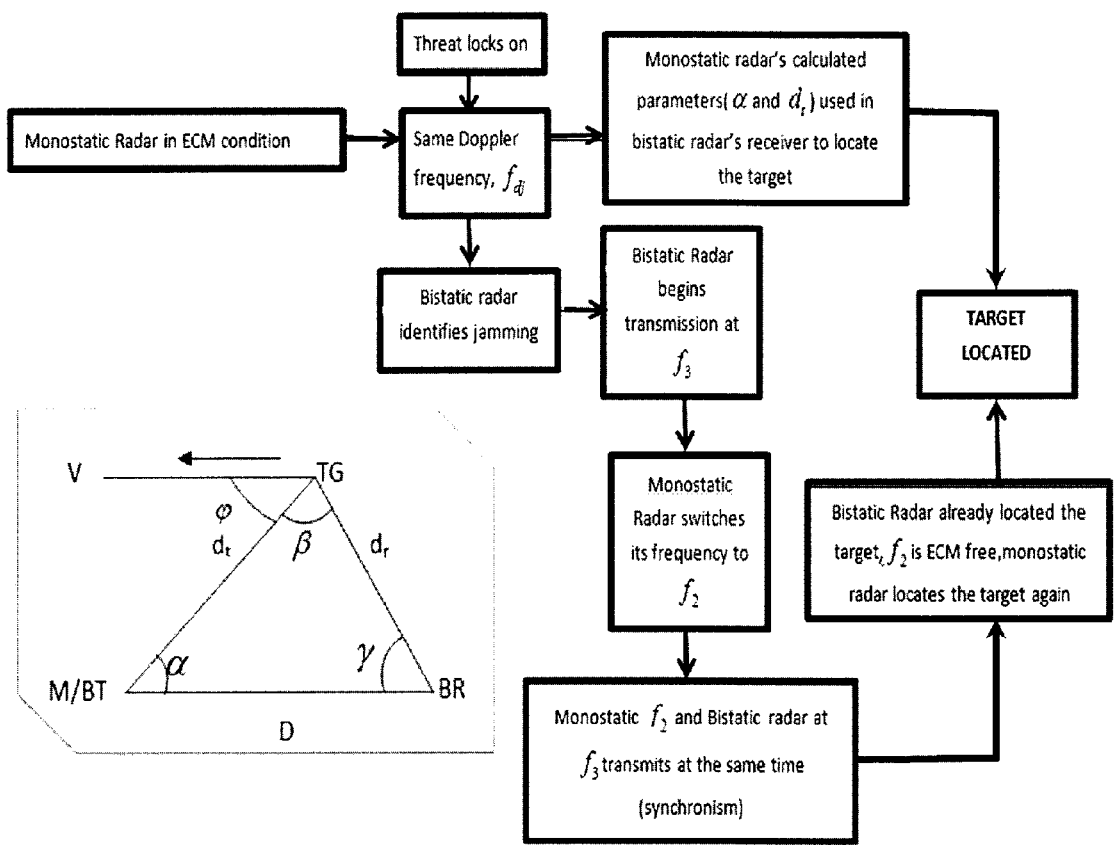
FIG. 5 depicts a sequence of steps if the target tries to deceive the radar by VGPO/RGPO.

FIG. 3 shows the signal to noise ratio corresponding to the bi-static receiver that has not been jammed where as FIG. 4 is representing the signal to noise ratio corresponding to the mono-static radar that is noise jammed by the target threat.

In case of velocity deception jamming, the original range is locked on at the beginning. The mono-static radar calculates the distance from the transmitter to the target and the angle subtended by its location and the target's location. These quantities are calculated with in time $t_1$, and this is the time when original Doppler frequency is being sent (true Doppler). However when the target starts the deception, the Doppler frequency for both the stations can turn out to be the same and the locations tracked down by both the radars would be different.

The moment radar's tracking circuit locks on to the false target, if the jamming pod covers the area including both M and BR, the Doppler frequency for both stations would come out to be the same. If it does not cover such a large area, the location tracked down by both M and BR would be different. At this instant, the transmitter of bi-static radar starts its transmission at a different operating frequency $f_3$. The mono-static radar also switches its frequency to $f_2$ after a certain delay. In the proposed approach, the system switches the frequencies of its transmitter only after the jamming is detected at two physically different locations. Therefore, the disadvantages of frequency agility which affects the coherence between consecutive echoes are also mitigated.

The bi-static transmitter remains in silent mode in ECM free condition and it only begins to transmit when M begins to jam. At this point of time the M switches its frequency and begins to operate at different frequency and from now onwards the BT and M both begins to transmit at the same time (synchronism in transmission) and it further creates difficulty for the target to jam 3 different frequencies at the same time.

What is claimed is:

1. A method for preventing deception jamming of radars by a target comprising:
   providing a mono-static radar equipped with a transmitter and a receiver;
   providing a bi-static radar transmitter co-located with the mono-static radar;
   providing a bi-static radar receiver located at a known distance away from the bi-static transmitter such that the bi-static receiver, the bi-static transmitter and a target are in a triangular configuration;
   allowing the mono-static radar, the bi-static receiver and the bi-static transmitter to be synchronized with each other;
   allowing the mono-static and bi-static radar to operate on a different frequency;
   determining the Doppler frequency by the mono-static receiver and bi-static receiver and ascertaining jamming if the Doppler frequency recorded is found the same by both the mono-static and the bi-static receivers;
   calculating the distance between the mono-static radar and the object prior to jamming;
   changing the frequency of bi-static transmitter when the Doppler frequency read by the mono-static and bi-static radar are the same to continually monitor the velocity and the position of the target.

2. The method according to claim 1 for preventing deception jamming wherein the deception is a result of range gate pull off or velocity gate pull off.

\* \* \* \* \*